United States Patent
Hwang et al.

(10) Patent No.: US 11,512,153 B2
(45) Date of Patent: Nov. 29, 2022

(54) METHOD OF PREPARING AROMATIC VINYL COMPOUND-VINYL CYANIDE COMPOUND POLYMER AND APPARATUS FOR PREPARING THE SAME

(71) Applicant: LG CHEM, LTD., Seoul (KR)

(72) Inventors: Jeong A Hwang, Daejeon (KR); Daeyoung Shin, Daejeon (KR); Sungkeun Jang, Daejeon (KR); Eun Jung Joo, Daejeon (KR); Won Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 433 days.

(21) Appl. No.: 16/634,094

(22) PCT Filed: Aug. 1, 2019

(86) PCT No.: PCT/KR2019/009587
§ 371 (c)(1),
(2) Date: Jan. 24, 2020

(87) PCT Pub. No.: WO2020/130264
PCT Pub. Date: Jun. 25, 2020

(65) Prior Publication Data
US 2021/0070895 A1    Mar. 11, 2021

(30) Foreign Application Priority Data

Dec. 18, 2018   (KR) .................. 10-2018-0164399
Jun. 19, 2019   (KR) .................. 10-2019-0072784

(51) Int. Cl.
*C08F 6/00*     (2006.01)
*C08F 2/01*     (2006.01)
*C08F 212/10*   (2006.01)

(52) U.S. Cl.
CPC .............. *C08F 6/001* (2013.01); *C08F 2/01* (2013.01); *C08F 212/10* (2013.01)

(58) Field of Classification Search
USPC ......................... 528/497, 493, 501
See application file for complete search history.

(56) References Cited

U.S. PATENT DOCUMENTS 2,941,985 A * 6/1960 Amos .................. C08F 6/10
                                                 159/13.1
4,550,149 A * 10/1985 Morris ................ C08F 212/10
                                                 526/342

FOREIGN PATENT DOCUMENTS

CN      1276801 A      12/2000
CN      1697850 A      11/2005
(Continued)

OTHER PUBLICATIONS

Search Report dated Nov. 6, 2019 for PCT Application No. PCT/KR2019/009587.
(Continued)

*Primary Examiner* — Fred M Teskin (57) ABSTRACT

The present invention relates to a method of preparing an aromatic vinyl compound-vinyl cyanide compound polymer including a step of separating volatile components from a polymerization product containing an aromatic vinyl compound-vinyl cyanide compound polymer, a residual aromatic vinyl monomer, a residual vinyl cyanide monomer, and an organic solvent using a volatilization tank, and a step of condensing the separated volatile components using a condenser, wherein an organic solvent or an aromatic vinyl monomer is sprayed onto the volatile components being transferred to the condenser. Volatile components may be fully condensed in a condenser, thereby significantly reducing the amount of volatile components discharged to the outside without being condensed. Therefore, wastewater (Continued)

treatment costs consumed in treating the volatile components may be reduced, and the amount of vinyl cyanide monomers harmful to the human body discharged into the atmosphere may be significantly reduced.

13 Claims, 1 Drawing Sheet

(56) References Cited

FOREIGN PATENT DOCUMENTS

| CN | 101838354 A | 9/2010 |
|---|---|---|
| JP | S5980404 A | 5/1984 |
| JP | H1149804 A | 2/1999 |
| JP | 2000226417 A | 8/2000 |
| JP | 2000264904 A | 9/2000 |
| JP | 2003-0292528 A | 10/2003 |
| JP | 2004-0244527 A | 9/2004 |
| KR | 19990001928 A | 1/1999 |
| KR | 20070073028 A | 7/2007 |
| KR | 20150028615 A | 3/2015 |
| KR | 10-20160021604 A | 2/2016 |
| KR | 20160021604 A | 2/2016 |
| KR | 1020160048011 A | 5/2016 |
| KR | 20170047031 A | 5/2017 |
| TW | 201016724 A | 5/2010 |

OTHER PUBLICATIONS

First Office Action issued by Taiwan Patent Office for related application TW108129628, dated May 6, 2021.
Supplementary European Search Report for Application No. EP19824186, dated Jun. 24, 2020.
Examination Report for related India application No. 202017001434, dated Jul. 8, 2022.

* cited by examiner

METHOD OF PREPARING AROMATIC VINYL COMPOUND-VINYL CYANIDE COMPOUND POLYMER AND APPARATUS FOR PREPARING THE SAME

CROSS-REFERENCE TO RELATED APPLICATIONS

The application is a National Phase of International Application No.: PCT/KR2019/009587 filed on Aug. 1, 2019, which claims priority to Korean Patent Application No. 10-2018-0164399, filed on Dec. 18, 2018, and Korean Patent Application No. 10-2019-0072784, re-filed on Jun. 19, 2019, based on the priority of the above patent, in the Korean Intellectual Property Office, the disclosures of each of which are incorporated herein by reference.

Technical Field

The present invention relates to a method of preparing an aromatic vinyl compound-vinyl cyanide compound polymer and an apparatus for preparing the same. More specifically, the present invention relates to a method of preparing an aromatic vinyl compound-vinyl cyanide compound polymer including a step of separating volatile components from a polymerization product containing an aromatic vinyl compound-vinyl cyanide compound polymer, a residual aromatic vinyl monomer, a residual vinyl cyanide monomer, and an organic solvent using a volatilization tank; and a step of condensing the separated volatile components using one condenser or two or more condensers connected in series, wherein the method includes a step of spraying an organic solvent onto the separated volatile components being transferred from the volatilization tank to the condenser; or a step of spraying an organic solvent or an aromatic vinyl monomer onto the volatile components not being condensed in a first condenser and being transferred to a second condenser when the two or more condensers connected in series are used, and to an apparatus for preparing the aromatic vinyl compound-vinyl cyanide compound polymer. According to the present invention, the amount of residual monomers and organic solvents discharged may be reduced.

Background Art

In general, aromatic vinyl compound-vinyl cyanide compound polymers have excellent moldability, rigidity, and electrical properties, and thus are widely used in various fields including office automation (OA) equipment such as computers, printers, and copiers, home appliances such as televisions and audio systems, electric and electronic components, and general goods. In particular, aromatic vinyl compound-vinyl cyanide compound polymers having improved heat resistance have been used in home appliances, interior materials for housing and automobiles, and the like due to the properties thereof of being not deformed at high temperature.

An aromatic vinyl compound-vinyl cyanide compound polymer is prepared by reacting an aromatic vinyl compound and a vinyl cyanide compound in an organic solvent. As a result of the reaction, a polymerization product containing the aromatic vinyl compound-vinyl cyanide compound polymer is obtained. In this case, in addition to the final product, monomers and the organic solvent remain in the polymerization product. Accordingly, a process for removing the residual monomers and organic solvent is essential.

According to a general procedure for preparing an aromatic vinyl compound-vinyl cyanide compound polymer, polymerization is performed in a reactor; a polymerization product discharged from the reactor after polymerization is transferred to a volatilization tank, and volatile components such as residual monomers and organic solvents and an aromatic vinyl compound-vinyl cyanide compound polymer are separated from each other in the volatilization tank; and condensation of the separated volatile components is performed using a condenser, and purification is performed to obtain a final product, an aromatic vinyl compound-vinyl cyanide compound polymer.

In general, a condensation system consisting of two or three condensers is used. In this case, condensation efficiency can be improved by increasing the pressure in the condensers and lowering the temperature of a refrigerant. However, due to installation limitations, there is a limit in lowering the temperature of a supplied refrigerant, resulting in discharge of uncondensed volatile components. In addition, when the amount of vinyl cyanide monomers having low boiling points is increased, condensation efficiency is lowered.

Uncondensed volatile components are discharged to the stream through a wastewater treatment system or to the atmosphere. In this case, wastewater treatment incurs significant costs, and the discharged volatile components cause environmental pollution.

Therefore, to reduce the amount of volatile components discharged to the atmosphere or introduced into a wastewater treatment system when preparing an aromatic vinyl compound-vinyl cyanide compound polymer, a method of preparing an aromatic vinyl compound-vinyl cyanide compound polymer using a condenser having improved condensation efficiency is required.

RELATED ART DOCUMENTS

Patent Documents (Patent Document 1) KR 10-2007-0073028 A

DISCLOSURE

Technical Problem

Therefore, the present invention has been made in view of the above problems, and it is one object of the present invention to provide a method of preparing an aromatic vinyl compound-vinyl cyanide compound polymer including a step of separating volatile components from a polymerization product containing an aromatic vinyl compound-vinyl cyanide compound polymer, a residual aromatic vinyl monomer, a residual vinyl cyanide monomer, and an organic solvent using a volatilization tank; and a step of condensing the separated volatile components using one condenser or two or more condensers connected in series, wherein the method includes a step of spraying an organic solvent onto the separated volatile components being transferred from the volatilization tank to the condenser; or a step of spraying an organic solvent or an aromatic vinyl monomer onto the volatile components not being condensed in a first condenser and being transferred to a second condenser when the two or more condensers connected in series are used, and an apparatus for preparing the aromatic vinyl compound-vinyl cyanide compound polymer. According to the present invention, the amount of residual monomers and organic solvents discharged may be reduced.

The above and other objects of the present invention can be achieved by the present disclosure described below.

Technical Solution

In accordance with one aspect of the present invention, provided is a method of preparing an aromatic vinyl compound-vinyl cyanide compound polymer including separating volatile components from a polymerization product containing an aromatic vinyl compound-vinyl cyanide compound polymer, a residual aromatic vinyl monomer, a residual vinyl cyanide monomer, and an organic solvent using a volatilization tank; and condensing the separated volatile components using one condenser or two or more condensers connected in series, wherein the method includes spraying an organic solvent onto the separated volatile components being transferred from the volatilization tank to the condenser; or spraying an organic solvent or an aromatic vinyl monomer onto the volatile components not being condensed in a first condenser and being transferred to a second condenser when the two or more condensers connected in series are used.

In accordance with another aspect of the present invention, provided is an apparatus for preparing an aromatic vinyl compound-vinyl cyanide compound polymer including a volatilization tank for separating volatile components from a polymerization product containing an aromatic vinyl compound-vinyl cyanide compound polymer, a residual aromatic vinyl monomer, a residual vinyl cyanide monomer, and an organic solvent; and one condenser or two or more condensers connected in series for condensing the separated volatile components, wherein the apparatus includes a spray means for spraying an organic solvent into a transfer pipe for transferring the separated volatile components to the condenser; or a spray means for spraying an organic solvent or an aromatic vinyl monomer into a transfer pipe for transferring the volatile components, which have not been condensed in a first condenser, to a second condenser, when the two or more condensers connected in series are included.

Advantageous Effects

According to the present invention, when an aromatic vinyl compound-vinyl cyanide compound polymer is prepared, an organic solvent or an aromatic vinyl monomer is sprayed onto volatile components being transferred to a first condenser or the volatile components not being condensed in the first condenser and being transferred to a second condenser without replacing equipment. Through this process, the content of vinyl cyanide monomers having low boiling points contained in the volatile components can be reduced, thereby improving condensation efficiency. Therefore, wastewater treatment costs consumed in treating uncondensed volatile components can be reduced, and the amount of volatile components harmful to the human body discharged into the atmosphere can be significantly reduced.

BEST MODE

Hereinafter, the method of preparing an aromatic vinyl compound-vinyl cyanide compound polymer according to the present invention will be described in detail.

When an aromatic vinyl compound-vinyl cyanide compound polymer is prepared, volatile components separated from a polymerization product are not fully condensed in a condensation process and are discharged to the outside. In this case, wastewater treatment costs are incurred and environmental pollution is caused. To solve these problems, the present inventors have made efforts, and as a result, confirmed that when an organic solvent or a monomer is added to volatile components being transferred to a condenser, condensation efficiency is improved and the amount of volatile components discharged without being condensed is reduced. Based on these findings, the present inventors conducted additional studies and completed the present invention.

The method of preparing an aromatic vinyl compound-vinyl cyanide compound polymer according to the present invention is as follows.

The method of preparing an aromatic vinyl compound-vinyl cyanide compound polymer according to the present invention includes a step of separating volatile components from a polymerization product containing an aromatic vinyl compound-vinyl cyanide compound polymer, a residual aromatic vinyl monomer, a residual vinyl cyanide monomer, and an organic solvent using a volatilization tank; and a step of condensing the separated volatile components using one condenser or two or more condensers connected in series, wherein the method includes a step of spraying an organic solvent onto the separated volatile components being transferred from the volatilization tank to the condenser; or a step of spraying an organic solvent or an aromatic vinyl monomer onto the volatile components not being condensed in a first condenser and being transferred to a second condenser when the two or more condensers connected in series are used. According to the method of the present invention, condensation efficiency may be improved, and the amount of volatile components discharged may be significantly reduced.

In the present invention, the first and second condensers may be any two condensers of two or more condensers connected in series, respectively. In this case, the first condenser may be the condenser of the first stage, and the second condenser may be the condenser of the second stage.

For example, the method of preparing an aromatic vinyl compound-vinyl cyanide compound polymer according to the present invention includes a step of separating volatile components from a polymerization product containing an aromatic vinyl compound-vinyl cyanide compound polymer, a residual aromatic vinyl monomer, a residual vinyl cyanide monomer, and an organic solvent using a volatilization tank; and a step of condensing the separated volatile components using two or more condensers connected in series, wherein the method includes a step of spraying an organic solvent onto volatile components being transferred to a first condenser after being separated in the volatilization tank; or a step of spraying an organic solvent or an aromatic vinyl monomer onto the volatile components not being condensed in the first condenser and being transferred to a second condenser. According to the method of the present invention, condensation efficiency may be improved, thereby reducing the amount of the volatile components discharged.

For example, the method of preparing an aromatic vinyl compound-vinyl cyanide compound polymer may include a step of spraying an organic solvent onto volatile components being transferred to a first condenser after being separated in the volatilization tank; and a step of spraying an organic solvent or an aromatic vinyl monomer onto the volatile components not being condensed in the first condenser and being transferred to a second condenser. In this case, condensation efficiency may be improved, thereby significantly reducing the amount of the volatile components discharged.

For example, the method may include a step of polymerizing the aromatic vinyl compound and the vinyl cyanide compound before the step of separating the volatile components.

For example, the aromatic vinyl compound-vinyl cyanide compound polymer may be prepared by polymerizing the aromatic vinyl compound and the vinyl cyanide compound in an organic solvent.

For example, when the polymerization reaction is performed, one or more selected from the group consisting of initiators, molecular weight regulators, and emulsifiers may be included.

For example, the polymerization reaction may be bulk polymerization, solution polymerization, or emulsion polymerization, preferably bulk polymerization or solution polymerization. In this case, the mechanical properties such as tensile strength and impact strength, heat resistance, and heat stability of the prepared aromatic vinyl compound-vinyl cyanide compound polymer may be excellent.

In the present invention, a reaction method for obtaining the aromatic vinyl compound-vinyl cyanide compound polymer is not particularly limited, and general polymerization methods may be used.

For example, the step of separating the volatile components in the volatilization tank may be performed at a temperature of 220 to 260° C. under a pressure of 35 Torr or less, preferably a temperature of 225 to 255° C. under a pressure of 15 to 35 Torr. Within this range, the volatile components may be effectively separated from the aromatic vinyl compound-vinyl cyanide compound polymer.

Volatilization tanks generally used in the art to which the present invention pertains may be used as the volatilization tank of the present invention without particular limitation.

For example, the separated volatile components may include 5 to 35% by weight of the vinyl cyanide compound, 45 to 80% by weight of the aromatic vinyl compound, and 5 to 50% by weight of the organic solvent.

As a specific example, the separated volatile components may include 5 to 20% by weight of the vinyl cyanide compound, 45 to 59% by weight of the aromatic vinyl compound, and 25 to 45% by weight of the organic solvent, or may include 15 to 35% by weight of the vinyl cyanide compound, 60 to 80% by weight of the aromatic vinyl compound, and 5 to 25% by weight of the organic solvent.

For example, the aromatic vinyl compound-vinyl cyanide compound polymer passed through the volatilization tank may be transferred to a pelletizer and cut therein. Then, cooling and drying are performed to obtain the aromatic vinyl compound-vinyl cyanide compound polymer in a pellet form.

In the present invention, two or more condensers are preferably connected to each other in series, or two condensers may be connected to each other in series. In this case, condensation efficiency may be improved.

In the present invention, condensers commonly used in the art to which the present invention pertains may be used as the condensers of the present invention without particular limitation.

For example, in the step of spraying the organic solvent or the aromatic vinyl monomer onto the volatile components not being condensed in the first condenser and being transferred to the second condenser, the organic solvent or the aromatic vinyl monomer may be sprayed at a flow rate of 10 to 220 kg/hr or 10 to 110 kg/hr, preferably 10 to 90 kg/hr, more preferably 10 to 40 kg/hr. In this case, the content of residual vinyl cyanide monomers having low boiling points contained in the volatile components may be reduced, thereby improving condensation efficiency.

For example, in the step of spraying the organic solvent onto the volatile components being transferred to the first condenser after being separated in the volatilization tank, the flow rate of the organic solvent may be 10 to 100 kg/hr, preferably 20 to 90 kg/hr. In the step of spraying the organic solvent or the aromatic vinyl monomer onto the volatile components not being condensed in the first condenser and being transferred to the second condenser, the flow rate of the organic solvent or the aromatic vinyl monomer may be 10 to 100 kg/hr, preferably 15 to 90 kg/hr. In this case, condensation efficiency may be improved, thereby significantly reducing the amount of the volatile components discharged.

For example, in the step of spraying the organic solvent onto the volatile components being transferred to the first condenser after being separated in the volatilization tank, the organic solvent may be sprayed at a temperature of −10 to 40° C., preferably 0 to 30° C., more preferably 15 to 25° C. Within this range, condensation efficiency may be improved.

In the present invention, the temperature of the organic solvent sprayed to the first condenser is not particularly limited.

For example, in the step of spraying the organic solvent or the aromatic vinyl monomer onto the volatile components not being condensed in the first condenser and being transferred to the second condenser, the organic solvent or the aromatic vinyl monomer may be sprayed at a flow rate of 10 to 200 kg/hr or 10 to 110 kg/hr, preferably 10 to 90 kg/hr, more preferably 10 to 40 kg/hr. In this case, the content of residual vinyl cyanide monomers having low boiling points contained in the volatile components may be reduced, thereby improving condensation efficiency.

In the present invention, flow rates may be measured using a flow meter or calculated by a mass balance equation. According to the mass balance equation, the flow rate of uncondensed volatile components may be calculated using an input, an output, and a recovered amount.

For example, in the step of spraying the organic solvent or the aromatic vinyl monomer onto the volatile components not being condensed in the first condenser and being transferred to the second condenser, the organic solvent or the aromatic vinyl monomer may be sprayed at a temperature of −10 to 40° C., preferably 0 to 30° C., more preferably 15 to 25° C. Within this range, condensation efficiency may be improved.

In the present invention, the temperature of the organic solvent or the aromatic vinyl monomer sprayed to the second condenser is not particularly limited.

For example, condensation in the first condenser may be performed at a refrigerant temperature of 20 to 35° C. under an operating pressure of 3 to 100 Torr, preferably at a refrigerant temperature of 25 to 33° C. under an operating pressure of 15 to 35 Torr, more preferably at a refrigerant temperature of 25 to 30° C. under an operating pressure of 15 to 30 Torr. Within this range, condensation efficiency may be improved.

In the present invention, the operating pressure refers to the internal pressure of the condenser formed when the condenser is operated.

For example, condensation in the second condenser may be performed at a refrigerant temperature of −3 to 4° C. under an operating pressure of 5 to 50 Torr, preferably at a refrigerant temperature of −1 to 4° C. under an operating pressure of 7 to 25 Torr, more preferably at a refrigerant temperature of 0 to 4° C. under an operating pressure of 10 to 20 Torr. Within this range, condensation efficiency may be improved.

For example, condensates condensed in the first and second condensers may be recovered, purified, and reintroduced into a reactor. In this case, raw material costs may be reduced.

For example, the volatile components not condensed in the second condenser may be transferred to a vacuum unit, dissolved in a circulating fluid of a water-cooled pump, and discharged through a wastewater treatment process. In this process, some of the volatile components may be released into the atmosphere. According to the present invention, the amount of the volatile components released into the atmosphere may be significantly reduced, and environmental pollution may be prevented.

For example, the organic solvent may include one or more selected from the group consisting of toluene, ethylbenzene, xylene, methylethylketone, and isobutylmethyl ketone. Preferably, the organic solvent used in the polymerization reaction and the organic solvent to be sprayed are the same. In this case, components having high boiling points may be added to the volatile components, and as a result, the ratio of components having low boiling points, i.e., residual vinyl cyanide monomers, contained in the volatile components may be reduced, thereby improving condensation efficiency.

For example, the aromatic vinyl compound may include one or more selected from the group consisting of styrene, α-methyl styrene, p-methyl styrene, p-bromostyrene, p-chlorostyrene, and o-bromostyrene. In this case, the ratio of residual vinyl cyanide monomers having low boiling points contained in the volatile components may be reduced, thereby improving condensation efficiency.

The apparatus for preparing the aromatic vinyl compound-vinyl cyanide compound polymer according to the present invention includes a volatilization tank for separating volatile components from a polymerization product containing an aromatic vinyl compound-vinyl cyanide compound polymer, a residual aromatic vinyl monomer, a residual vinyl cyanide monomer, and an organic solvent; and one condenser or two or more condensers connected in series for condensing the separated volatile components, wherein the apparatus includes a spray means for spraying an organic solvent into a transfer pipe for transferring the separated volatile components to the condenser; or a spray means for spraying an organic solvent or an aromatic vinyl monomer into a transfer pipe for transferring the volatile components, which have not been condensed in a first condenser, to a second condenser, when the two or more condensers connected in series is included. According to the present invention, condensation efficiency may be improved, and amount of volatile components released after condensation may be negligible.

In the present invention, means configured to be connected to the transfer pipe and capable of spraying the organic solvent or the aromatic vinyl monomer into the transfer pipe may be used as the spray means of the present invention without particular limitation. For example, a spray pipe, a spray bottle, and the like may be used as the spray means, and the spray means may be provided with a spray nozzle.

For example, the apparatus for preparing an aromatic vinyl compound-vinyl cyanide compound polymer according to the present invention includes a volatilization tank for separating volatile components from a polymerization product containing an aromatic vinyl compound-vinyl cyanide compound polymer, a residual aromatic vinyl monomer, a residual vinyl cyanide monomer, and an organic solvent; and two or more condensers connected in series for condensing the separated volatile components, wherein the apparatus includes a spray pipe for spraying an organic solvent into a transfer pipe for transferring the separated volatile components to a first condenser; or a spray pipe for spraying an organic solvent or an aromatic vinyl monomer into a transfer pipe for transferring the volatile components, which have not been condensed in the first condenser, to a second condenser. In this case, condensation efficiency may be improved, and the amount of the volatile components released after condensation may be negligible.

For example, the apparatus for preparing an aromatic vinyl compound-vinyl cyanide compound polymer may include a spray pipe for spraying an organic solvent into a transfer pipe for transferring the separated volatile components to a first condenser; and a spray pipe for spraying an organic solvent or an aromatic vinyl monomer into a transfer pipe for transferring the volatile components, which have not been condensed in the first condenser, to a second condenser. In this case, condensation efficiency may be improved, and the amount of the volatile components released after condensation in the second condenser may be negligible.

For example, the spray pipe may include a nozzle.

In the present invention, nozzles commonly used in the art to which the present invention pertains may be used as the nozzle of the present invention without particular limitation.

The volatilization tank and the condenser included in the apparatus for preparing an aromatic vinyl compound-vinyl cyanide compound polymer follow the above description, and thus description thereof will be omitted.

The method of preparing an aromatic vinyl compound-vinyl cyanide compound polymer and the apparatus for preparing the same according to the present invention will be described with reference to FIGS. 1 and 2. Embodiments of the present invention disclosed in the present specification and drawings are only provided to aid in understanding of the present invention, and the present invention is not limited to the embodiments. In addition, only means necessary for describing the present invention are described, and other obvious means for carrying out the method and apparatus are omitted in the drawings.

Figure 1:
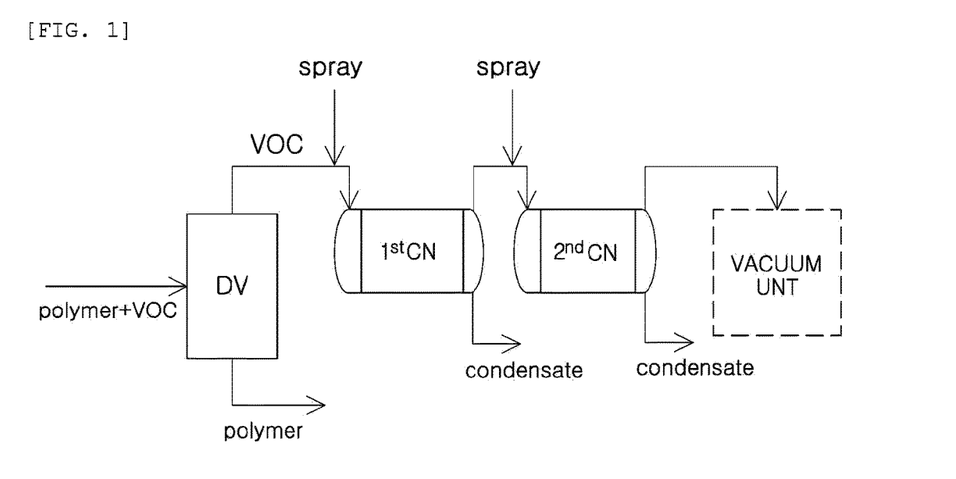
FIG. 1 schematically illustrates a step of separating volatile components from a polymerization product containing an aromatic vinyl compound-vinyl cyanide compound polymer, a residual aromatic vinyl monomer, and an organic solvent and condensing the separated volatile components, according to the present invention.

FIG. 1 schematically illustrates a volatilization tank (DV), a first condenser ($1^{st}$ CN), a second condenser ($2^{nd}$ CN), a vacuum unit, a transfer pipe, and a spray pipe, which are used in Examples 1 to 21 according to the present invention, and shows the apparatus of the present invention including a volatilization tank for separating volatile components from a polymerization product containing an aromatic vinyl compound-vinyl cyanide compound polymer, a residual aromatic vinyl monomer, a residual vinyl cyanide monomer, and an organic solvent, wherein the apparatus includes a spray pipe for spraying an organic solvent into a transfer pipe for transferring the separated volatile components to a first condenser; or a spray pipe for spraying an organic solvent or an aromatic vinyl monomer into a transfer pipe for transferring the volatile components, which have not been condensed in the first condenser, to a second condenser.

In addition, the volatile components not condensed in the second condenser may be transferred to a vacuum unit and dissolved in a circulating fluid of a water-cooled pump. Then, the dissolved volatile components may be discharged to the outside through a wastewater treatment process or to the atmosphere.

Although not shown in the drawing, condensates condensed in the first and second condensers may be reintroduced into a reactor.

Figure 2:
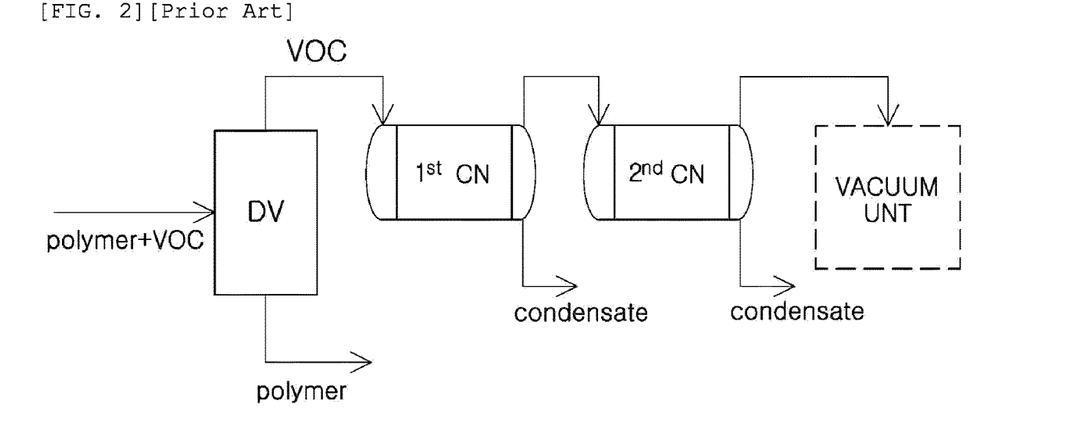
FIG. 2 schematically illustrates a step of separating volatile components from a polymerization product containing an aromatic vinyl compound-vinyl cyanide compound polymer, a residual aromatic vinyl monomer, and an organic solvent and condensing the separated volatile components, according to the related art.

In addition, FIG. 2 schematically illustrates a volatilization tank (DV), a first condenser ($1^{st}$ CN), a second condenser ($2^{nd}$ CN), and a vacuum unit, which are used in Comparative Examples 1, 8, and 12. Referring to FIG. 2, in the volatilization tank, volatile components are separated from a polymerization product containing an aromatic vinyl compound-vinyl cyanide compound polymer, a residual aromatic vinyl monomer, and an organic solvent. The separated volatile components are condensed in the first and second condensers. In this case, the volatile components not condensed in the second condenser are transferred to a vacuum unit, compressed by a pump, and dissolved in a circulating fluid of a water-cooled pump. Then, the dissolved volatile components are discharged to the outside through a wastewater treatment process or to the atmosphere.

Although not shown in the drawing, condensates condensed in the first and second condensers may be reintroduced into a reactor.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Conditions for each step are shown in Tables 1 to 5 below.
Volatile Component Separation Step
Separation Conditions A: Separation was performed at a temperature of 230° C. under a pressure of 20 Torr. In this case, volatile components separated in a volatilization tank included 55.8% by weight of a styrene monomer, 7.25% by weight of an acrylonitrile monomer, and 37% by weight of toluene.
Separation Conditions B: Separation was performed at a temperature of 250° C. under a pressure of 30 Torr. In this case, volatile components separated in a volatilization tank included 68.2% by weight of a styrene monomer, 23.7% by weight of an acrylonitrile monomer, and 9.1% by weight of toluene.
Separation Conditions C: Separation was performed at a temperature of 240° C. under a pressure of 20 Torr. In this case, volatile components separated in a volatilization tank included 62% by weight of a styrene monomer, 15% by weight of an acrylonitrile monomer, and 23% by weight of toluene.

Condensation Step
Condensation Conditions A: In the first condenser, condensation was performed at a refrigerant temperature of 30° C. under a pressure of 20 Torr. In the second condenser, condensation was performed at a refrigerant temperature of 2° C. under a pressure of 10 Torr.
Condensation Conditions B: In the first condenser, condensation was performed at a refrigerant temperature of 30° C. under a pressure of 30 Torr. In the second condenser, condensation was performed at a refrigerant temperature of 2° C. under a pressure of 20 Torr.
Condensation Conditions C: In the first condenser, condensation was performed at a refrigerant temperature of 25° C. under a pressure of 15 Torr. In the second condenser, condensation was performed at a refrigerant temperature of −1° C. under a pressure of 10 Torr.
Spray substances: Toluene is represented by "1"; styrene is represented by "2"; α-methyl styrene is represented by "3"; acrylonitrile is represented by "4"; and methacrylonitrile is represented by "5".

Example 1

Volatile components were separated according to Separation Conditions A. Then, the separated volatile components were condensed in a first condenser according to Condensation Conditions A, and then uncondensed volatile components were transferred to a second condenser and condensed therein. At this time, toluene was sprayed at a flow rate of 45 kg/hr onto the volatile components being transferred to the first condenser after separation in the volatilization tank, and no spray was performed on the volatile components not being condensed in the first condenser and being transferred to the second condenser.

Example 2

Volatile components were separated according to Separation Conditions A. Then, the separated volatile components were condensed in a first condenser according to Condensation Conditions A, and then uncondensed volatile components were transferred to a second condenser and condensed therein. At this time, no spray was performed on the volatile components being transferred to the first condenser after separation in the volatilization tank, and styrene was sprayed at a flow rate of 30 kg/hr onto the volatile components not being condensed in the first condenser and being transferred to the second condenser.

Example 3

Volatile components were separated according to Separation Conditions A. Then, the separated volatile components were condensed in a first condenser according to Condensation Conditions A, and then uncondensed volatile components were transferred to a second condenser and condensed therein. At this time, no spray was performed on the volatile components being transferred to the first condenser after separation in the volatilization tank, and α-methyl styrene was sprayed at a flow rate of 30 kg/hr onto the volatile components not being condensed in the first condenser and being transferred to the second condenser.

Example 4

Volatile components were separated according to Separation Conditions A. Then, the separated volatile components were condensed in a first condenser according to Condensation Conditions A, and then uncondensed volatile components were transferred to a second condenser and condensed therein. At this time, no spray was performed on the volatile components being transferred to the first condenser after separation in the volatilization tank, and toluene was sprayed at a flow rate of 80 kg/hr onto the volatile components not being condensed in the first condenser and being transferred to the second condenser.

Example 5

Volatile components were separated according to Separation Conditions A. Then, the separated volatile components were condensed in a first condenser according to Condensation Conditions A, and then uncondensed volatile components were transferred to a second condenser and condensed therein. At this time, toluene was sprayed at a flow rate of 20 kg/hr onto the volatile components being transferred to the first condenser after separation in the volatilization tank, and styrene was sprayed at a flow rate of 15 kg/hr onto the volatile components not being condensed in the first condenser and being transferred to the second condenser.

Examples 6 to 21

According to separation conditions and condensation conditions shown in Tables 1 to 3 below, volatile components were separated and condensed, and the spray substances were sprayed onto the volatile components.

Comparative Example 1

The same procedure as Example 1 was performed except that toluene was not sprayed onto the volatile components being transferred to the first condenser after separation in the volatilization tank.

Comparative Examples 2 to 16

According to separation conditions and condensation conditions shown in Tables 4 and 5 below, volatile components were separated and condensed, and the spray substances were sprayed onto the volatile components.

Test Example

In Examples 1 to 21 and Comparative Examples 1 to 16, the flow rate of the volatile components not condensed in the second condenser and discharged therefrom was measured using a flow meter installed between the second condenser and the vacuum unit, and the results are shown in Tables 1 to 5 below.

In addition, in Examples 1 to 14 and Comparative Examples 1 to 16, the vinyl cyanide monomer not condensed in the first condenser and transferred to the second condenser was sampled from the pipe disposed between the first condenser and the second condenser, and the content of the sampled vinyl cyanide monomer was quantified by gas chromatography. The results are shown in Tables 1 to 5 below.

TABLE 1

| Classification | Examples | | | | | | |
| --- | --- | --- | --- | --- | --- | --- | --- |
| | 1 | 2 | 3 | 4 | 5 | 6 | 7 |
| Separation conditions in volatilization tank | A | A | A | A | A | A | A |
| Condensation conditions in condenser | A | A | A | A | A | A | A |
| Substance sprayed on volatile components being transferred to the first condenser | 1 | — | — | — | 1 | 1 | 1 |
| Flow rate of substance sprayed on volatile components being transferred to the first condenser (kg/hr) | 45 | — | — | — | 20 | 20 | 30 |
| Substance sprayed on volatile components being transferred to the second condenser | — | 2 | 3 | 1 | 2 | 3 | 1 |
| Flow rate of substance sprayed on volatile components being transferred to the second condenser (kg/hr) | — | 30 | 30 | 80 | 15 | 15 | 30 |
| Content of vinyl cyanide monomer which is not condensed in the first condenser and is transferred to the second condenser (% by weight) | 12.5 | 13.0 | 13.0 | 11.8 | 12.9 | 12.9 | 12.2 |
| Flow rate of volatile components discharged without being condensed in the second condenser (kg/hr) | 0 | 0 | 0 | 0 | 0 | 0 | 0 |

TABLE 2

| Classification | Examples | | | | | | |
|---|---|---|---|---|---|---|---|
| | 8 | 9 | 10 | 11 | 12 | 13 | 14 |
| Separation conditions in volatilization tank | B | B | B | B | B | B | B |
| Condensation conditions in condenser | B | B | B | B | B | B | B |
| Substance sprayed on volatile components being transferred to the first condenser | — | — | — | — | 1 | 1 | 1 |
| Flow rate of substance sprayed on volatile components being transferred to the first condenser (kg/hr) | 30 | — | — | — | 10 | 10 | 10 |
| Substance sprayed on volatile components being transferred to the second condenser | — | 2 | 3 | 1 | 2 | 3 | 1 |
| Flow rate of substance sprayed on volatile components being transferred to the second condenser (kg/hr) | — | 10 | 12 | 14 | 10 | 10 | 10 |
| Content of vinyl cyanide monomer which is not condensed in the first condenser and is transferred to the second condenser (% by weight) | 52.9 | 53.4 | 53.1 | 52.7 | 52.7 | 52.7 | 52.7 |
| Flow rate of volatile components discharged without being condensed in the second condenser (kg/hr) | 0 | 0 | 0 | 0 | 0 | 0 | 0 |

TABLE 3

| Classification | Examples | | | | | | |
|---|---|---|---|---|---|---|---|
| | 15 | 16 | 17 | 18 | 19 | 20 | 21 |
| Separation conditions in volatilization tank | C | C | C | C | C | C | C |
| Condensation conditions in condenser | C | C | C | C | C | C | C |
| Substance sprayed on volatile components being transferred to the first condenser | 1 | — | — | — | 1 | 1 | 1 |
| Flow rate of substance sprayed on volatile components being transferred to the first condenser (kg/hr) | 150 | — | — | — | 65 | 65 | 90 |
| Substance sprayed on volatile components being transferred to the second condenser | — | 2 | 3 | 1 | 2 | 3 | 1 |
| Flow rate of substance sprayed on volatile components being transferred to the second condenser (kg/hr) | — | 110 | 110 | 215 | 65 | 65 | 90 |
| Content of vinyl cyanide monomer which is not condensed in the first condenser and is transferred to the second condenser (% by weight) | 19.7 | 21.5 | 21.5 | 18.4 | 20.7 | 20.7 | 19.2 |
| Flow rate of volatile components discharged without being condensed in the second condenser (kg/hr) | 0 | 0 | 0 | 0 | 0 | 0 | 0 |

TABLE 4

| Classification | Comparative Examples | | | | | | | |
|---|---|---|---|---|---|---|---|---|
| | 1 | 2 | 3 | 4 | 5 | 6 | 7 | 8 |
| Separation conditions in volatilization tank | A | A | A | A | A | A | A | B |
| Condensation conditions in condenser | A | A | A | A | A | A | A | B |
| Substance sprayed on volatile components being transferred to the first condenser | — | 2 | 3 | 4 | 5 | — | — | — |
| Flow rate of substance sprayed on volatile components being transferred to the first condenser (kg/hr) | — | 30 | 30 | 30 | 30 | — | — | — |
| Substance sprayed on volatile components being transferred to the second condenser | — | — | — | — | — | 4 | 5 | — |
| Flow rate of substance sprayed on volatile components being transferred to the second condenser (kg/hr) | — | — | — | — | — | 30 | 30 | — |
| Content of vinyl cyanide monomer which is not condensed in the first condenser and is transferred to the second condenser (% by weight) | 13.9 | 14.2 | 14.5 | 16.6 | 17.0 | 19.5 | 19.5 | 55.3 |
| Flow rate of volatile components discharged without being condensed in the second condenser (kg/hr) | 15.0 | 17.1 | 22.3 | 52.0 | 17.0 | 86.8 | 41.6 | 14.8 |

TABLE 5

| Classification | Comparative Examples | | | | | | | |
|---|---|---|---|---|---|---|---|---|
| | 9 | 10 | 11 | 12 | 13 | 14 | 15 | 16 |
| Separation conditions in volatilization tank | B | B | B | C | C | C | C | C |
| Condensation conditions in condenser | B | B | B | C | C | C | C | C |
| Substance sprayed on volatile components being transferred to the first condenser | 2 | 4 | — | — | 2 | 3 | 4 | — |
| Flow rate of substance sprayed on volatile components being transferred to the first condenser (kg/hr) | 30 | 30 | — | — | 150 | 150 | 150 | — |
| Substance sprayed on volatile components being transferred to the second condenser | — | — | 4 | — | — | — | — | 5 |
| Flow rate of substance sprayed on volatile components being transferred to the second condenser (kg/hr) | — | — | 30 | — | — | — | — | 110 |
| Content of vinyl cyanide monomer which is not condensed in the first condenser and is transferred to the second condenser (% by weight) | 55.5 | 55.8 | 59.7 | 26.2 | 27.2 | 29.7 | 31.9 | 39.3 |
| Flow rate of volatile components discharged without being condensed in the second condenser (kg/hr) | 15.4 | 21.0 | 51.3 | 58.0 | 59.9 | 80.5 | 177.8 | 129.7 |

As shown in Tables 1 to 5, in the case of Examples 1 to 21 according to the present invention, the amount of the volatile components not condensed in the second condenser and discharged therefrom is negligible. Accordingly, wastewater treatment costs consumed in treating the discharged volatile components are not required. On the other hand, in the case of Comparative Examples 1, 8, and 12 according to conventional methods, the amount of the volatile components not condensed in the second condenser is large, showing the flow rate of 14.8 to 58.0 kg/hr.

In addition, in the case of Comparative Examples 2, 3, 9, 13, and 14, in which the aromatic vinyl monomer was sprayed into the first condenser, and in the case of Comparative Examples 4, 5, 10, and 15, in which the vinyl cyanide monomer was sprayed into the first condenser, the amount of the volatile components not condensed in the second condenser and discharged therefrom was significantly increased. Accordingly, costs consumed in treating the discharged volatile components may be increased.

In addition, in the case of Comparative Examples 6, 7, 11, and 16, in which the vinyl cyanide monomer was sprayed into the second condenser, the amount of the volatile components not condensed in the second condenser and discharged therefrom was significantly increased.

The invention claimed is:

1. A method of preparing an aromatic vinyl compound-vinyl cyanide compound polymer, comprising:
    separating volatile components from a polymerization product containing an aromatic vinyl compound-vinyl cyanide compound polymer, residual aromatic vinyl monomer, residual vinyl cyanide monomer, and an organic solvent using a volatilization tank; and
    condensing the separated volatile components using one condenser or two or more condensers connected in series,
    wherein the method comprises spraying an organic solvent onto the separated volatile components being transferred from the volatilization tank to the condenser; or
    spraying an organic solvent or an aromatic vinyl monomer onto the volatile components not being condensed in a first condenser and being transferred to a second condenser when the two or more condensers connected in series are used.

2. The method according to claim 1, wherein the method comprises spraying the organic solvent onto the volatile components being transferred to the first condenser after being separated in the volatilization tank; and
    spraying the organic solvent or the aromatic vinyl monomer onto the volatile components not being condensed in the first condenser and being transferred to the second condenser.

3. The method according to claim 1, wherein the separated volatile components comprise 5 to 35% by weight of a vinyl cyanide compound, 45 to 80% by weight of an aromatic vinyl compound, and 5 to 50% by weight of an organic solvent.

4. The method according to claim 1, wherein, in the spraying of the organic solvent, the organic solvent is sprayed at a flow rate of 10 to 200 kg/hr.

5. The method according to claim 1, wherein, in the spraying of the organic solvent, the organic solvent is sprayed at a temperature of −10 to 40° C.

6. The method according to claim 1, wherein, in the spraying of the organic solvent or the aromatic vinyl monomer, the organic solvent or the aromatic vinyl monomer is sprayed at a flow rate of 10 to 220 kg/hr.

7. The method according to claim 1, wherein, in the spraying of the organic solvent or the aromatic vinyl monomer onto the volatile components not being condensed in the first condenser and being transferred to the second condenser, the organic solvent or the aromatic vinyl monomer is sprayed at a temperature of −10 to 40° C.

8. The method according to claim 1, wherein condensation in the first condenser is performed at a refrigerant temperature of 20 to 35° C. under an operating pressure of 3 to 100 Torr.

9. The method according to claim 1, wherein condensation in the second condenser is performed at a refrigerant temperature of −3 to 4° C. under an operating pressure of 5 to 50 Torr.

10. The method according to claim 1, wherein the separating is performed at a temperature of 220 to 260° C. under a pressure of 35 Torr or less.

11. The method according to claim 1, wherein condensates condensed in the first and second condensers are recovered, purified, and reintroduced into a reactor.

12. An apparatus for preparing an aromatic vinyl compound-vinyl cyanide compound polymer, comprising:
    a volatilization tank for separating volatile components from a polymerization product containing an aromatic vinyl compound-vinyl cyanide compound polymer, residual aromatic vinyl monomer, residual vinyl cyanide monomer, and an organic solvent; and
    one condenser or two or more condensers connected in series for condensing the separated volatile components,
    wherein the apparatus comprises a spray means for spraying an organic solvent into a transfer pipe for transferring the separated volatile components to the condenser; or
    a spray means for spraying an organic solvent or an aromatic vinyl monomer into a transfer pipe for transferring the volatile components, which have not been condensed in a first condenser, to a second condenser, when the two or more condensers connected in series are comprised.

13. The apparatus according to claim 12, wherein the apparatus comprises a spray pipe for spraying the organic solvent into the transfer pipe for transferring the separated volatile components to the first condenser; and
    a spray pipe for spraying the organic solvent or the aromatic vinyl monomer into the transfer pipe for transferring the volatile components, which have not been condensed in the first condenser, to the second condenser.

* * * * *